Nov. 8, 1966    E. C. MERSEREAU    3,283,861
SLACK ADJUSTER
Filed Sept. 22, 1964    3 Sheets-Sheet 1
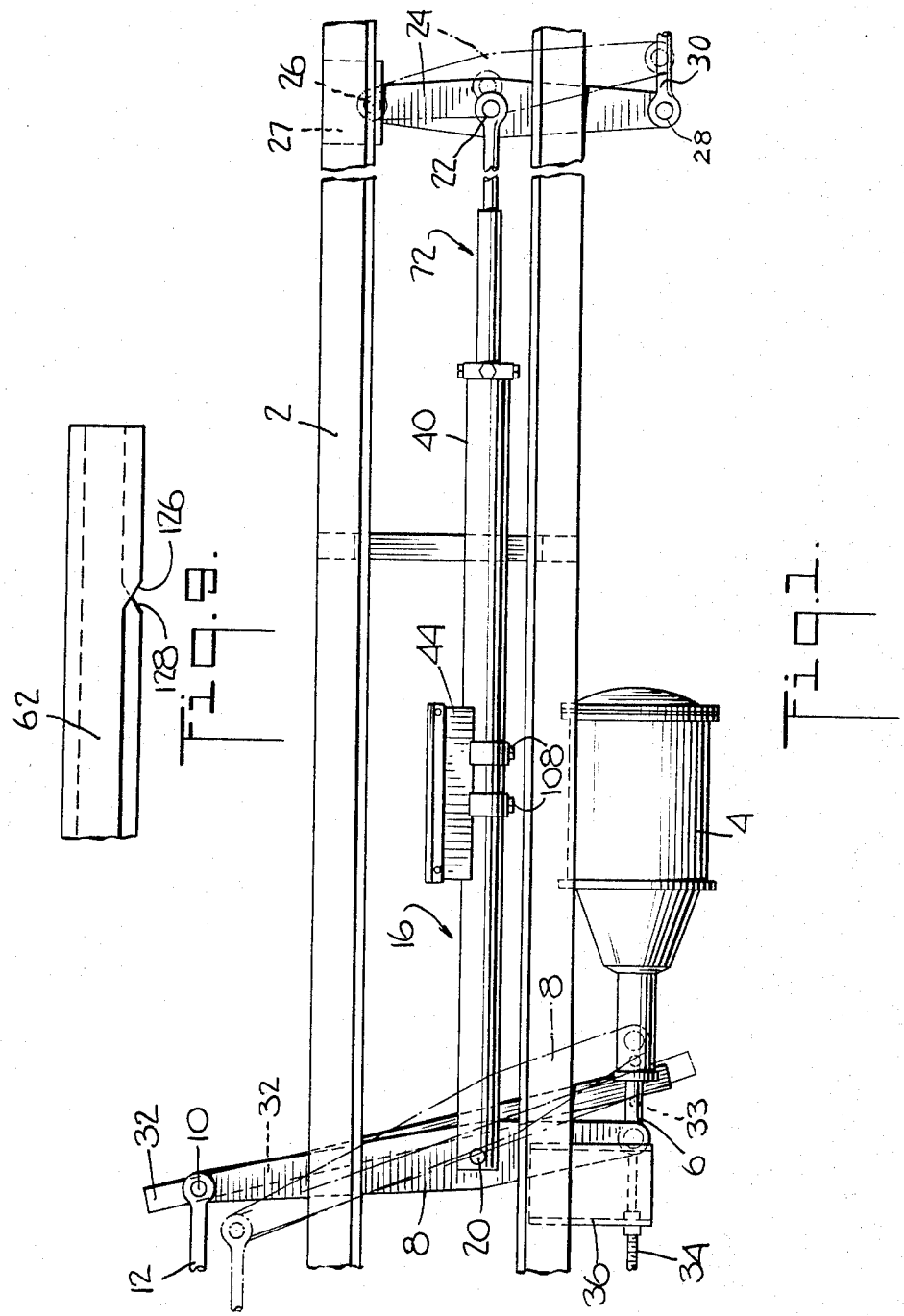
INVENTOR.
EVERARD C. MERSEREAU
BY
Ward, Haselton, McElhannon, Orme, Brooks, & Fitzpatrick
ATTORNEYS

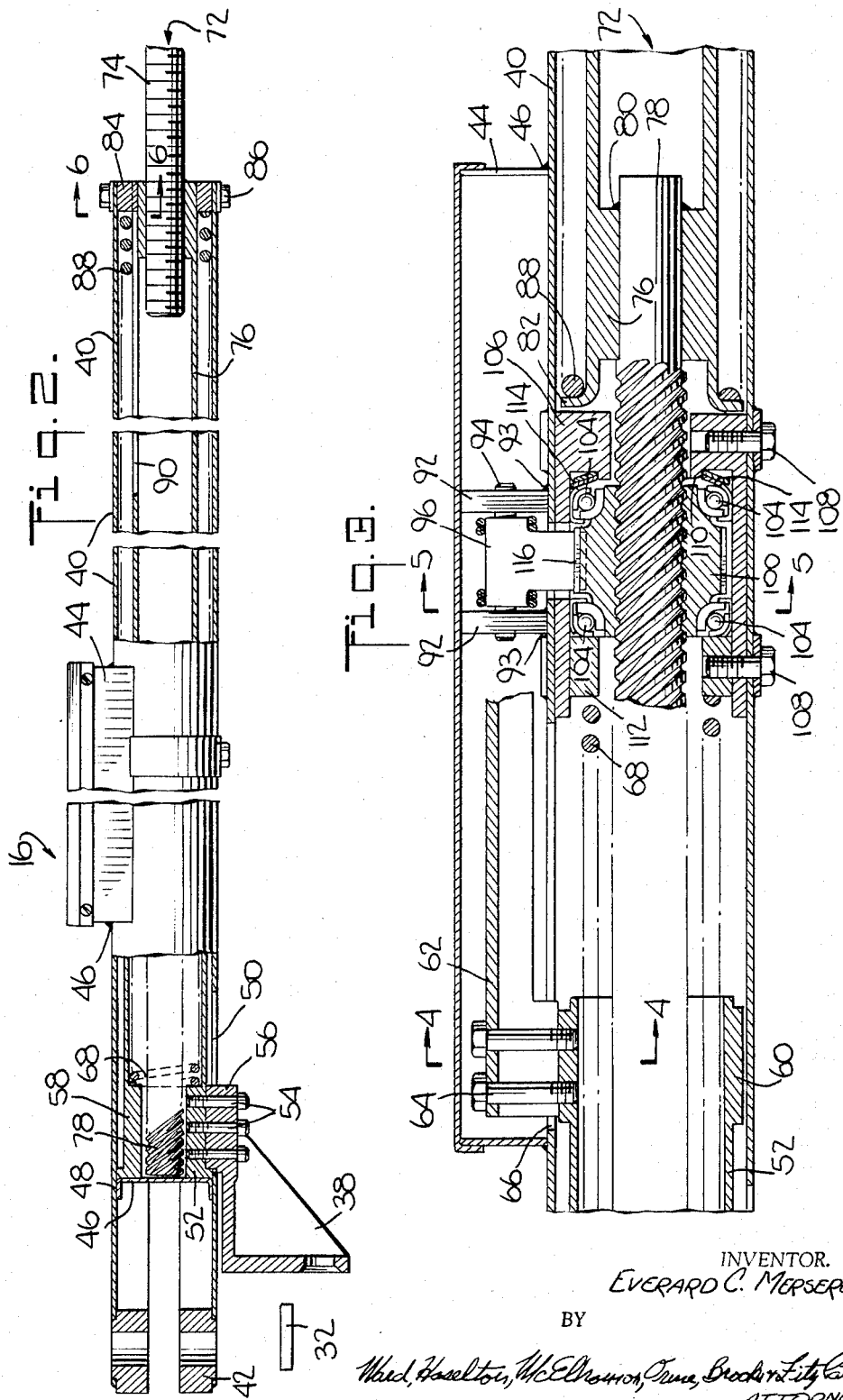

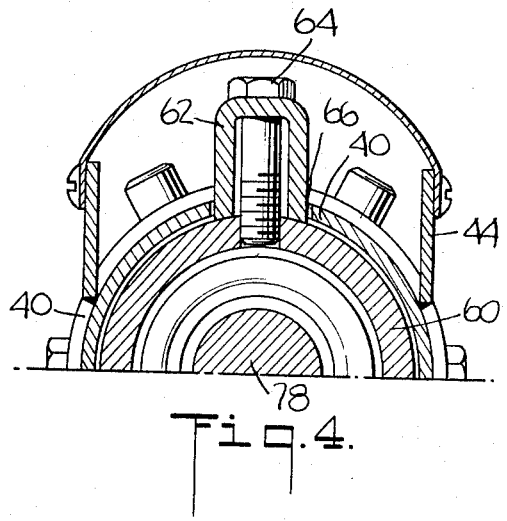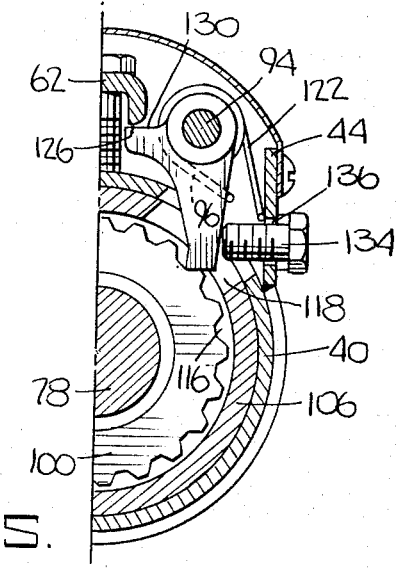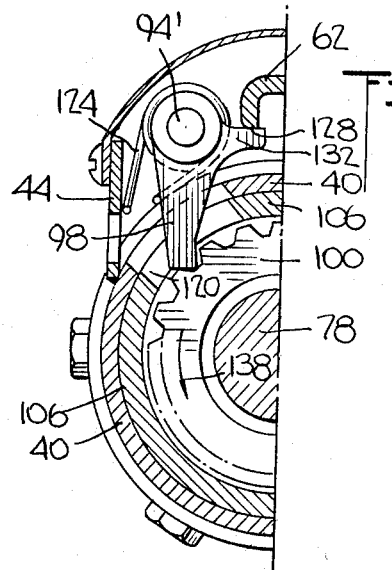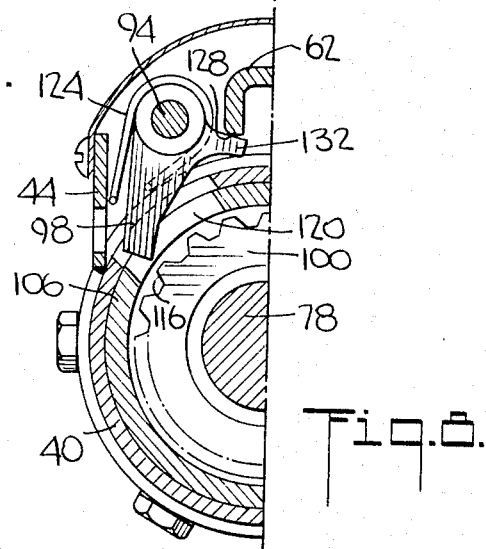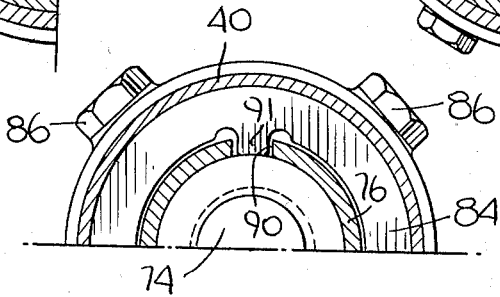

United States Patent Office 3,283,861
Patented Nov. 8, 1966

3,283,861
SLACK ADJUSTER
Everard C. Mersereau, Westfield, N.J., assignor, by mesne assignments, to Robert M. Holloway and Robert L. Ludington, both of Michigan City, Ind.
Filed Sept. 22, 1964, Ser. No. 398,216
3 Claims. (Cl. 188—196)

This invention relates to automatic slack adjusters for the brake rigging of railway cars and like vehicles. More particularly the invention relates to automatic slack adjusters of the kind which are provided with brake shoes operated by a fluid actuated cylinder and piston arrangement through brake rigging, including live levers, dead or fulcrum levers and connecting rods.

The present invention concerns improvements in the slack adjuster for power transmission systems described in the United States Patent No. 3,001,612 and provides a number of advantages over the slack adjuster disclosed in said patent.

An object of this invention is to provide a new and improved slack adjusting device which is practical in operation, and which is not too bulky or cumbersome for the limited space in which the device is to be utilized. Generally, the slack adjusting device for railway rolling stock is disposed between or directly under the center sills of the car, and hence only limited space is available.

Also, an object of the present invention resides in a slack adjusting device which requires a small linear movement for actuation thereof which provides quicker brake release response, and which provides small increments of brake adjustment.

Still another object of this invention resides in the provision of a new and improved slack adjusting device, which is lightweight but of sufficient structural strength to transfer the large forces involved.

Yet another object of this invention resides in the provision of a slack adjusting devices which has increased capacity for removing slack per linear foot thereof. It will be appreciated that the overall length of the slack adjusting unit is fixed by standards and that, as a practical matter, these standards must be adhered to in practice, and hence the capacity thereof is of importance.

Further, an object of this invention is to provide a novel slack adjusting unit which is substantially sealed or enclosed by a housing. This is important because the unit must operate under various adverse operating conditions, particularly out-of-doors and in environments where sand and dust particles could readily cause operational difficulties.

Another object of the present invention is to provide a novel slack adjusting device, which is safe and reliable in operation. Since these devices are operated in the field of transportation, safety of operation is particularly important in order to prevent injury to many persons.

Another object of this invention resides in the provision of a slack adjusting device which is interchangeable with slack adjusting devices presently operating on railway cars. This is particularly important due to the fact that railway rolling stock generally have a relatively long operating life, and hence many mechanical items contained therein, including brake slack adjusters, require replacement during the life of a railway car. If the replacement unit is physically interchangeable with the previous unit, less work and expenses are involved for the changeover.

In essence, the present invention contemplates the provision of a new and improved slack adjusting device comprising a support member and a pull rod having a threaded portion, the rod being movably mounted with respect to the support member. Spring means are provided which act between the support member and the rod for urging the rod in a predetermined direction. An adjusting nut is threadably mounted on the threaded portion of the pull rod and is provided with teeth thereon. A holding pawl and a load pawl located on the support member adjacent the teeth are engageable, respectively, with opposite sides of the teeth for purposes of preventing movement of the adjusting nut, and thereby preventing movement of the rod in a first direction and in an opposite direction. Also, resilient means are provided for urging the pawls into engagement with the teeth. An actuator is movably located on the support member and is engageable with the pawls. In a first position thereof the actuator is adapted to engage and hold the load pawl out of engagement with the teeth, while permitting the holding pawl to engage the teeth. In a second position thereof, the actuator engages and holds the holding pawl out of engagement with the teeth and permits the load pawl to engage the teeth. Further, means are provided which act between the support member and the actuator for urging the actuator in a predetermined direction.

Other features, objects and advantages will be apparent from the following description of an embodiment of the invention, and the novel features will be particularly pointed out hereinafter in connection with the appended claims.

In the accompanying drawings:

FIG. 1 is a schematic plan view illustrating the slack adjusting device of the invention in association with a typical brake rigging arrangement;

FIG. 2 is an enlarged side elevation, partially in section, of a slack adjusting device constructed in accordance with the concept of this invention;

FIG. 3 is an enlarged longitudinal sectional view of the center portion of the slack adjusting device showing the pull rod, adjusting nut and pawl mechanism;

FIG. 4 is a transverse sectional view taken along the line 4—4 of FIG. 3 and illustrating in detail a portion of the cam bar;

FIG. 5 is a longitudinal half sectional view taken along the line 5—5 of FIG. 3 showing the load pawl in engagement with the adjusting nut;

FIG. 6 is a transverse sectional view taken along the line 6—6 of FIG. 2 and showing the spring retainer means in the tubular housing;

FIG. 7 is a longitudinal half sectional view similar to FIG. 5 but showing the holding pawl in engagement with the adjusting nut;

FIG. 8 is a half sectional view similar to FIG. 7 but showing the holding pawl out of engagement with the adjusting nut; and FIG. 9 is a detailed longitudinal view of the cam bar showing the cam surfaces.

In the illustrated embodiment of the invention, the slack adjusting device is illustrated in FIG. 1 in connection with a typical brake rigging currently employed in railway rolling stock. A typical freight car has a center sill 2 which incorporates a fluid cylinder 4 mounted thereon, the fluid cylinder having a piston rod 6 extending therefrom. The fluid cylinder 4 is actuated by means of a fluid such as air, for example, which is supplied to the cylinder under pressure for purposes of operating the piston rod 6. A live lever 8 is pivotally connected at one end to the rod 6 and extends substantially transversely of the car and center sill 2. The other end of the live lever 8 is pivotally connected, as at 10, to one end of a pull rod 12, and the pull rod 12 is connected to a linkage system which operates brake shoes (not shown) mounted to engage the periphery of the wheels on one truck of the railway car. One end of the slack adjusting device 16 is pivotally connected as at 20 to an intermediate portion of the live lever 8, and the other end thereof is pivotally connected as at 22 to an intermediate portion of a dead fulcrum lever 24. The dead fulcrum lever 24 is pivoted at one end thereof, as at fulcrum 26, in fixed relationship with respect to the railway car or center sill 2, fulcrum 26 being supported by bracket 27 secured to the sill 2. A pull rod 30 is pivotally connected to the other end of the lever 24 as at 28, and is also connected to a conventional linkage which operates brake shoes (not shown) disposed in braking position with respect to the wheels of a second truck of a freight car.

One end of the live lever 8 is pivotally connected to an activator or activating lever 32 as at 10. A bracket 36 is secured to the sill 2 of the railway car and an eye bolt 34 is mounted thereon. The opening in the eye bolt 34 is adapted to receive the other end of the activating lever 32 as at 33 (FIG. 1). The relative position of the live lever 8, the activator lever 32, the piston rod 6, the slack adjusting device 16 and the fulcrum lever 24 are shown in solid lines in FIG. 1 when the brakes are fully applied. The aforementioned members are shown in broken lines in FIG. 1 when the brakes are released.

As shown in FIG. 2, an activating arm or trigger 38 extends downwardly from the slack adjusting device 16. When the brakes are applied, the activating lever 32 (FIG. 1) engages the activating arm 38 (FIG. 2) and causes operation of the slack adjusting device 16. When the brakes are released the activating arm 38 and the activator lever 32 separate, and when the brakes are applied, movement of the activating arm 38, as a result of its engagement with the activator lever 32, operates the mechanism of the slack adjusting device 16 in such a manner as to reduce the overall length of the adjusting device 16 when there is slack in the brake rigging. Thus, when there is slack in the brake rigging the distance between the pivot point 22 (FIG. 1) and the pivot point 20 decreases during application of the brakes.

As best seen in FIG. 2, the slack adjusting device 16 comprises a tubular housing 40 which is provided with a slotted end 42 for pivotally connecting, as at 20 (FIG. 1) to an intermediate portion of the live lever 8. A pawl box 44 is fixedly attached to the tubular housing 40 as at 46 (FIG. 2), and an abutment 46 is fixedly attached to the inside of the housing 40 as at 48. The housing 40 is provided with a slot 50 to allow for movement of the activating arm 38 which is connected to an actuator 52 as by means of screws 54. The actuator 52 is slidably mounted within the housing 40 and is provided with a collar portion 58 which is engageable with the stop 46 for preventing excessive movement in one direction and the other end of the actuator 52 is provided with a hub-like portion 60 (FIGS. 3 and 4) to which cam bar 62 is connected as by means of screws 64, the housing 40 being provided with a slot 66 (FIG. 3) to allow for movement of the cam bar 62. A coil spring 68 is mounted within the housing 40 and acts between the collar portion 58 (FIG. 2) and a bearing retainer 112 (FIG. 3) to urge the actuator 52 to the left as viewed in FIGS. 2 and 3.

As best seen in FIGS. 2 and 3 a pull rod assembly, designated generally at 72, comprises a pull rod portion 74 (FIG. 2), and a pull rod coupling 76 which receives a threaded end portion of the pull rod 74. The pull rod assembly 74 further comprises a threaded portion 78 (FIG. 3) which is fixedly attached to the pull rod coupling 76 as at 80. The pull rod coupling 76 is provided with a flange 82. Referring to FIG. 2 a spring retainer 84 is fixedly connected to the inside of the tubular housing 40 as by means of cap screws 86. A coil spring 88 is contained between the flange 82 (FIG. 3) and the spring retainer 84 (FIG. 2). This spring urges the pull rod assembly 72 to the left as viewed in FIGS. 2 and 3. As best seen in FIG. 6, the pull rod coupling 76 is provided with a slot or keyway 90 for receiving a key 91 depending from the spring retainer 84. This key and keyway prevent rotation of the pull rod assembly 72 with respect to the housing 40.

Referring to FIG. 3, a pair of abutments 92 is fixedly attached to the housing 40 as at 93 for supporting power axles 94 (one being shown in FIG. 3). Load pawl 96 is supported by power axle 94 as shown in FIG. 5, and holding pawl 98 is supported by power axle 94' as shown in FIG. 7. The threaded portion 78 (FIG. 3) is provided with a thread having a lead per revolution of approximately the same amount as the diameter of the bar, but this lead can be considerably more or less than this amount. An adjusting nut 100 (FIG. 3), containing the same threads as described hereinbefore in connection with the threaded portion 78 of the pull rod assembly 72, is loosely fitted over the threaded portion 78. It will be appreciated that the increment of take-up on the slack adjuster according to the aforementioned Patent No. 3,001,612 is approximately one-half of the spacing between the rack teeth. However, according to the present concept the increment of take-up is the increment of travel between the teeth on the adjusting nut 100 multiplied by the lead of the threads on the threaded portion 78.

The two opposing ends of the adjusting nut 100 (FIG. 3) are fitted with suitable frictionless bearings 104, and a bearing sleeve 106 is mounted inside the tubular housing 40 and attached thereto by suitable means such as cap screws 108. The sleeve 106 is provided with an abutment 110 which acts as a stop for the adjusting nut 100 when the unit is under load conditions. A bearing retainer 112 is provided for retaining the adjusting nut 100 and the bearings 104 in proper longitudinal relation with respect to the abutment 110. The bearing retainer 112 is secured to the sleeve 106 by the same suitable means that secures the sleeve 106 to the housing 40, which is, for example, cap screws 108.

A plurality of compression springs 114 is positioned within a recess in the sleeve 106 for the purpose of holding the adjusting nut 100 and its frictionless bearings in a position remote from the abutment 110 until such time as a load is imposed on the slack adjusting device. When a load is imposed on the slack adjusting device, the pull rod assembly 72 moves the nut 100 and its bearings to the right, as viewed in FIG. 3, compressing the springs 114 until the abutment 110 engages the right end of the adjusting nut 100, thereby transmitting the forces imposed by the brake operation through the bearing sleeve 106 to the tubular housing 40.

The center portion of the periphery of the adjusting nut 100 contains ratchet teeth 116, which are engageable with the pawls 96 and 98, a slot 118 (FIG. 5) extending through the housing 40 and bearing sleeve 106 for pawl 96 and a slot 120 (FIG. 7) extending through the housing 40 and the bearing sleeve 106 for the pawl 98. Referring to FIG. 5, load pawl 96 is urged into engagement with teeth 116 of the adjusting nut 100 by means of a spring 122, and as seen in FIGS. 7 and 8, holding pawl 98 is urged into engagement with the teeth 116 of the adjusting nut 100 by means of spring 124.

Referring next to FIG. 9, cam bar 62 is provided with a cam surface 126 and a cam surface 128, cam surface 126 being adapted to engage lug 130 of pawl 96 (FIG. 5) and cam surface 128 being adapted to engage lug 132 of holding pawl 98 for purposes of actuating the pawls, respectively.

As best seen in FIG. 5, a safety bolt 134 passes through a threaded opening 136 in the side wall of the pawl box 44 and engages the pawl 96 to lock the device in one position for safety purposes during shipment. This bolt is used only for shipment of the unit to the place intended for its application to a car, and it is thence removed and discarded.

In operation when the brakes are released, that is, when the piston rod 6 (FIG. 1) is in its retracted position shown by phantom lines in FIG. 1, the load pawl 96 (FIG. 5) is in its disengaged position and the holding pawl 98 is in its engaged position as illustrated in FIG. 7. As fluid or air under pressure is supplied to the cylinder 4, the piston rod 6 moves to the left, as viewed in FIG. 1, and at some point in the movement, the activating arm 38 engages the activating lever 32. As the brakes are further applied, and hence as the piston rod 6 moves further to the left as viewed in FIG. 1, the activating arm 38 is moved to the right with respect to the tubular housing 40, thereby compressing the spring 68 and causing the actuator 60 to move to the right with respect to the housing 40. At an intermediate stage in the application of the brakes, the actuator 60 will have moved the cam bar 62 (FIG. 3) to the right as viewed in FIG. 3 to a position wherein the cam surfaces 126 and 128 both will be engaging the lugs 130 and 132 of the pawls 96 and 98, respectively, and thereby lift the pawls 96 and 98 out of engagement with the teeth of the adjusting nut 100. At this time, namely, when both pawls are disengaged from the adjusting nut 100, if there is slack in the brake riggings, the pull rod assembly 72 will move to the left with respect to the housing 40 under the pressure of a spring 88, the nut 100 being free to rotate within the housing, thereby shortening the overall length of the slack adjusting device to pick-up the slack in the rigging. When the brakes are still further applied, and hence when the piston rod 6 (FIG. 1) moves further to the left, the actuator 60 (FIG. 3) moves the cam bar 62 further to the right because of the pressure exerted against the activating arm 38 by the activator lever 32. In this position the cam surface 128 will engage the lug 132 of the holding pawl 98 and disengage the holding pawl 98 from the teeth 116 of the adjusting nut 100. The cam surface 126, acting through lug 130 will lower the load pawl 96 allowing the load pawl 96 to rotate slightly in a clockwise direction as seen in FIG. 5 due to the force of the spring 122 so that load pawl 96 will engage the teeth 116 of the adjusting nut 100, and hence the adjusting nut 100 will be locked in position. When a further load is imposed on the unit the pull rod assembly 72 moves the nut 100 and its bearings 104 to the right with respect to the housing 40 (as viewed in FIG. 3), compressing the springs 114 until the abutment 110 comes into contact with the right end of the adjusting nut 100, thereby locking the slack adjusting device in a rigid position for braking. In the brake setting position, the forces imposed by the brake operation follow a course extending through the tubular housing 40, bearing retainer 106, adjusting nut 100, threaded portion 78 of the pull rod 72 to the remainder of the pull rod assembly 72.

When the brakes are released the cycle of operations described above is repeated in reverse order so that the parts return to their original positions, that is, the load pawl 96 becomes disengaged from the teeth 116 of the adjusting nut 100 and the holding pawl 98 becomes engaged with the teeth 116 of the adjusting nut 100.

When the device has taken up or shortened its length by 17 inches, for example, as compared to prior art devices of 12½ inches, for example, the mechanism is in the position shown in FIG. 3, that is, the left hand end (FIG. 2) of the threaded portion 78 of the pull rod assembly 72 has moved from the vicinity of the adjusting nut 100 to a position practically engaging the abutment 46. This means that the brake shoes have completely worn out and should be replaced. After replacing the brake shoes and fluid has again been supplied to the fluid cylinder 4 (FIG. 1), the piston moves to the left as viewed in FIG. 1, thereby urging the brake shoes (not shown) against the wheels (not shown) before the trigger or activating arm 38 contacts the activator lever 32. Since the holding pawl 98 is in engagement with the teeth 116 of the adjusting nut 100, and the load pawl 96 is disengaged from the same adjusting nut teeth, the force supplied to the pull rod assembly 72 pulls the threaded portion 78 thereof to the right as viewed in FIG. 3, at the same time compressing spring 88. This causes the adjusting nut 100 to rotate in the direction of the arrow 138 (FIG. 7), thereby ratcheting under the pawl 98, which is free to rotate outwardly away from the teeth at all times, against the smaller force of the spring 124. This action takes place until the activating arm 38 (FIG. 2) contacts the activating lever 32 (FIG. 1), which would move the activating arm 38 to the right as viewed in FIG. 2, thereby moving the cam bar 62 sufficiently to the right as viewed in FIG. 3 until the load pawl becomes seated in the teeth 116 of the nut 100, thereby locking the unit in the brake setting position.

It will be appreciated that the slack adjuster is, in effect, a double acting device and serves to maintain the travel of the piston rod 6 (FIG. 1) at a preselected amount automatically, and hence the braking force is uniformly applied in each car of a series of cars, the possibility of some cars being held back while other cars roll ahead is substantially eliminated.

It will be understood that various changes in the details, materials and arrangements of parts which have been herein described and illustrated in order to explain the nature of the invention, may be made by those skilled in the art within the principle and scope of the invention as expressed in the appended claims.

What is claimed and desired to be secured by Letters Patent is:

1. A slack adjusting device comprising a housing having first and second ends; a pull rod assembly having a threaded portion, a coupling portion, and a pull rod portion, said portions being fixedly interconnected one with respect to the other and said threaded portion and said coupling portion being disposed within said housing and the pull rod portion extending from said first end of the housing; spring means disposed within the housing and acting between the housing and the coupling portion of said pull rod assembly for urging the threaded portion away from said first end of the housing; an adjusting nut threadably mounted on the threaded portion of said pull rod and being provided with teeth on the circumference thereof; means mounting said adjusting nut within said housing for rotation, means for limiting the axial travel of said adjusting nut with respect to the housing, a load pawl and a holding pawl mounted in said housing adjacent said teeth and engageable respectively with opposite sides of the teeth for respectively preventing movement of said pull rod assembly in opposite directions; means engaging said pawls for moving said pawls into engagement with said teeth; a cam bar longitudinally movably mounted within said housing; an activating arm extending outwardly through a slot in the bottom of the housing and being adapted for longitudinal movement with respect to said housing, an actuator slidably mounted within the housing, means fixedly interconnecting said activating arm to said actuator, said actuator being provided with a collar portion for engaging an abutment disposed within said housing for preventing excessive movement in a direction away from said first end of the housing, said actuator further comprising a hub-like portion, said cam bar being fixedly connected to said hub-like portion, said cam bar being U-shaped and the ends of the arms being cam surfaces respectively, said cam surfaces being engageable with said pawl cam engaging portions respectively for disengaging the teeth engaging portions of said pawls from said teeth, said cam surfaces and said cam engaging portions being disposed with respect to said pawls so that in a first longitudinal position of the cam bar the load pawl is out of engagement with the teeth and the holding pawl is in engagement with one of said teeth, in a second longitudinal position of said cam bar the load pawl is in engagement with one of said teeth and the holding pawl is out of engagement with said teeth, and in a further longitudinal position of the cam bar, all of the pawls are out of engagement with said teeth; and spring means within the housing acting between the adjusting nut mounting means and said collar portion for urging the cam bar away from said first end of the housing.

2. A slack adjusting device comprising a housing having first and second ends; a pull rod assembly having a threaded portion, a coupling portion, and a pull rod portion, said portions being fixedly interconnected one with respect to the other and said threaded portion and said coupling portion being disposed within said housing and said pull rod portion extending from said first end of the housing; spring means disposed within the housing and acting between the housing and the coupling portion of said pull rod assembly for urging said threaded portion away from said first end of the housing; an adjusting nut threadably mounted on the threaded portion of said pull rod and being provided with teeth on the circumference thereof; bearing means for mounting said adjusting nut within the housing for rotation, bearing retainer means for said bearing means, resilient means for urging said adjusting nut away from said first end of the housing, said adjoining nut being movable towards said first end of the housing when an axial force is exerted thereon in the direction from the second end of the housing towards the first end of the housing, means for limiting the axial travel of said adjusting nut with respect to the housing, a load pawl and a holding pawl mounted in said housing adjacent said teeth and engageable respectively with opposite sides of the teeth for respectively preventing movement of said pull rod assembly in opposite directions means engaging said pawls for moving said pawls into engagement with said teeth; a cam bar longitudinally movably mounted within the housing, an activating arm extending outwardly through a slot in the bottom of the housing and being adapted for longitudinal movement with respect to the housing, an actuator slidably mounted within the housing, means fixedly interconnecting said activating arm and said actuator, said actuator being provided with a collar portion for engaging an abutment disposed within the housing for preventing excessive movement in a direction away from said first end of said housing, said actuator further comprising a hub-like portion, said cam bar being fixedly connected to said hub-like portion, said cam bar being U-shaped and the ends of the arms being cam surfaces respectively, said cam surfaces being engageable with said pawl cam engaging portions respectively for disengaging said teeth engaging portions of said pawls from said teeth, said cam surfaces and said cam engaging portions being disposed with respect to said pawls so that in a first longitudinal position of the cam bar said load pawl is out of engagement with said teeth and said holding pawl is in engagement with one of said teeth, in a second longitudinal position of the cam bar said load pawl is in engagement with one of said teeth and said holding pawl is out of engagement with said teeth, and in a further longitudinal position of the cam bar, all of said pawls are out of engagement with said teeth; and spring means within the housing acting between said bearing retainer means and said collar portion for urging the cam bar away from said first end of the housing.

3. A slack adjusting device according to claim 2 further comprising a safety bolt passing through a threaded opening in said housing for engaging at least one of said pawls to lock said device in one position during shipment.

References Cited by the Examiner
UNITED STATES PATENTS
3,096,859   7/1963   Showers et al. _____ 188—196

DUANE A. REGER, *Primary Examiner.*